Feb. 15, 1955    L. W. SPOONER    2,702,068
ALUMINUM PHOSPHATE BONDED ASBESTOS INSULATING MATERIAL
Filed Feb. 13, 1953

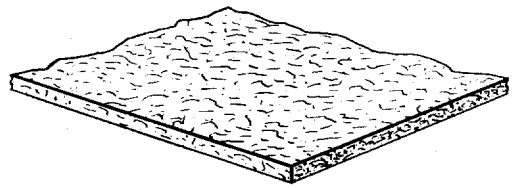

Fig. 1.

ASBESTOS SHEET IMPREGNATED WITH MONO-ALUMINUM PHOSPHATE.

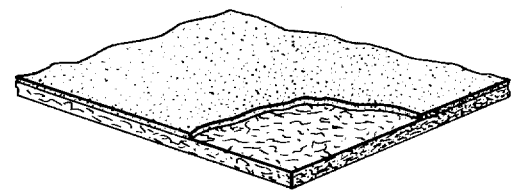

Fig. 2.

MONO-ALUMINUM PHOSPHATE IMPREGNATED ASBESTOS SHEET
COATED WITH ALUMINUM PHOSPHATE BONDING MATERIAL.

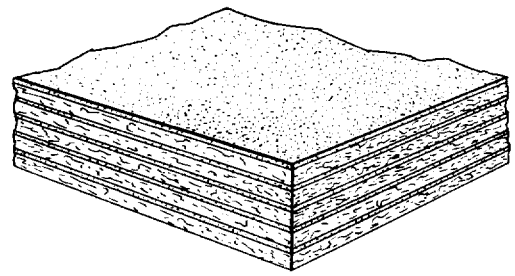

Fig. 3.

LAMINATE BUILT UP OF FIVE THICKNESSES OF THE COATED SHEET OF FIG. 2.

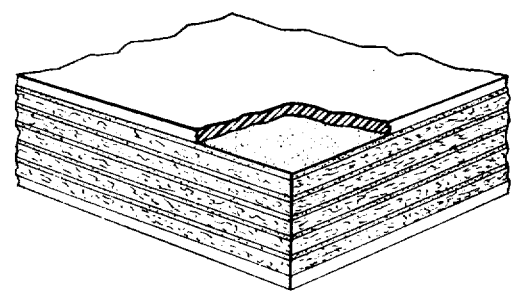

Fig. 4.

LAMINATE OF FIG. 3 WITH OUTER COATING OF AN ORGANO-POLYSILOXANE RESIN.

Inventor
Laurence W. Spooner
by Gilbert P Tarleton
His Attorney.

United States Patent Office 2,702,068
Patented Feb. 15, 1955

2,702,068

ALUMINUM PHOSPHATE BONDED ASBESTOS INSULATING MATERIAL

Laurence W. Spooner, Pittsfield, Mass., assignor to General Electric Company, a corporation of New York Application February 13, 1953, Serial No. 336,885

7 Claims. (Cl. 154—2.6)

The present invention relates to an aluminum phosphate-bonded asbestos insulating material. More particularly, it is concerned with a laminated asbestos sheet material containing an aluminum phosphate binder.

The invention has as its primary object the provision of an improved economical, hard, dense, laminated asbestos product, particularly adapted for high temperature electrical insulation applications.

A further object of the present invention is to provide an improved method of making a laminated asbestos product whereby there is obtained a laminated material of improved hardness and density which is particularly suitable for high temperature electrical insulation purposes.

These and other objects are accomplished in accordance with the following specification and annexed drawing showing a laminate constructed in accordance with this invention, wherein Fig. 1 illustrates asbestos sheet material impregnated with mono-aluminum phosphate; Fig. 2 illustrates the sheet of Fig. 1 with a layer of aluminum phosphate bonding material; Fig. 3 illustrates a laminate built up of a plurality of the coated sheets of Fig. 2; and Fig. 4 illustrates a laminate like that of Fig. 3 coated with an organo-polysiloxane resin.

The present invention is based on the discovery that improved insulating material suitable for high temperature uses can be obtained by impregnating asbestos sheet material, such as asbestos paper, with a solution of a mono-aluminum phosphate, drying the impregnated material and thereafter forming the impregnated sheet into a laminated structure employing as the binder, a higher aluminum phosphate of the formula $Al_x(H_{3-x}PO_4)_3$ wherein $x$ has a value of from about 1.3 to 1.7. As the result there is obtained a laminated structure in which the individual sheets are completely impregnated with an aluminum phosphate impregnant and are securely bonded together in the form of an extremely hard, dense product.

The aluminum phosphates employed in the practice of the present invention are described in Patent 2,460,344, Greger. Both the mono-aluminum phosphate employed for impregnating the individual sheets of asbestos and the higher aluminum phosphates employed for bonding these individual sheets into a laminated structure are water-soluble or water-dispersible products which, by removal of all or part of the water, are converted into solid products having excellent bonding and insulating characteristics.

The term "mono-aluminum phosphate" as used in the description of the present invention refers to the aluminum phosphates of the formula $Al(H_2PO_4)_3$ as well as the aluminum phosphates in which the aluminum to phosphate, $PO_4$, ratio varies slightly from the 1:3 ratio and may be as high as about 1.2:3. They are water soluble materials which can be employed in the form of relatively low viscosity solutions for the complete impregnation of the asbestos sheet material. They are further characterized by the fact that after removal of the water, in whole or in part, there is obtained an impregnated sheet of good flexibility and high strength which can be readily employed in the manufacture of laminated products.

The aluminum phosphates employed for bonding the impregnated sheet into a laminated structure are those which form a highly viscous aqueous solution having a viscosity which may be 100 times the viscosity of the mono-aluminum phosphate solution. These more viscous products after removal of all or part of the water are converted to relatively hard, somewhat brittle, resin-like solids and have been found to have excellent bonding action for the mono-aluminum phosphate impregnated sheets.

The asbestos sheet employed in the practice of the present invention may be any of the usual commercially available asbestos sheet materials consisting predominantly of asbestos fibers. The sheet material may consist entirely of asbestos fiber or it may contain small amounts of cellulose fiber, such as cotton fiber, frequently present in commercial asbestos sheets for strengthening purposes. Also included within the scope of the present invention are asbestos sheets containing minor quantities of bentonite or glass fibers, which sheets are presently employed for electrically insulating purposes.

In producing the laminated products, the asbestos sheet material is first impregnated with the mono-aluminum phosphate as, for example, by immersion of the sheet in a solution of the mono-aluminum phosphate in water of such concentration that after drying, the sheet will contain approximately 20 to 30%, by weight, aluminum phosphate. The impregnated sheet is thereafter dried to a tack-free state, either at room temperature or at more elevated temperatures up to about 150° C. or above until the volatile content, that is the water content, of the sheet is reduced to about 10 to 15% by weight. A preferred impregnating solution is an aqueous solution of the mono-aluminum phosphate having the formula $Al(H_2PO_4)_3$ containing sufficient water so that the solids content of the solution is from about 15 to 25% by weight. The asbestos sheet material is passed through this solution and thereafter through a drying oven or under drying lamps at such a rate that the resultant product contains about 25 to 30% mono-aluminum phosphate on the solid or dry basis and preferably from about 11 to 13% volatile material most of which is water. The resultant sheet has good flexibility and good strength and can easily be worked or handled in the preparation of a laminated material. For example, it can be wound into a cylinder at any time within a few days after the impregnation step. However, as there is a slow but continued reaction between the aluminum phosphate and the asbestos, it is necessary that any winding or other operation requiring considerable bending of the sheet material be carried out within two or three days after the impregnation step as otherwise the sheet becomes too brittle for proper handling.

In the preparation of the laminated structure, the mono-aluminum phosphate impregnated sheet is first coated with a rather viscous aqueous solution of a higher aluminum phosphate, preferably having an aluminum to phosphate ratio of about 1.65 to 3 before being formed into a laminated structure. The bonding phosphate solution should be of a concentration such that it contains about 45–55, preferably 50%, solids and has a viscosity of the order of about 2000–6000 centipoises.

The laminated structures may take various forms. A plurality of the coated sheets can be assembled in a stacked relationship and the stack pressed at an elevated temperature. Alternatively, a continuous asbestos sheet impregnated with a mono-aluminum phosphate and coated with the higher aluminum phosphate can be wrapped into the form of a cylinder, preferably with the application of some pressure during the wrapping operation, and thereafter subjected to conditions which effect the removal of at least part of the water present in the binder solution.

The manner in which the water and other volatile components are removed from the laminated structure will depend to some extent upon the type of structure involved. When the laminated material is manufactured by pressing the stack sheets between heated platens of a press, the platens may be heated to temperatures in the order of 120–150° C. However, before the pressure is removed, it is advisable to decrease the temperature to less than 100° C. in order to avoid damage to the pressed sheet by the bursting effect of any residual water vapor pressure. Thereafter the pressed sheets can be dried in a drying oven gradually at first at low (60–90° C.) temperatures to evaporate most of the free water, then at increased temperatures and ultimately at 200° C. for the dryness required in electrical insulation.

In the manufacture of cylinders and equivalent forms obtained by wrapping the coated and impregnated sheets on a suitable mandrel, it is usually advisable to air dry the wrapped products for a few hours at ordinary temperatures and thereafter subject the products to a slow bake at more elevated temperatures up to 100° C. followed by a bake at 200° to 250° C. until such time as the water content of the laminated material has been decreased to a desired point.

While the aluminum phosphate impregnated sheet is not thermoplastic in the sense that many organic resin treated sheets are thermoplastic, it does possess a slight degree of flow as a result of the presence of water and some water-soluble phosphates which have not reacted with the asbestos and which are still present as such in the sheet. Hence, when the coated and impregnated sheet or plurality of sheets are subjected to a forming pressure, either in a press or when wound into a cylinder there is sufficient flow of the bonding material to produce a dense void-free product. During the drying and heating steps two types of curing mechanisms are involved; one a slow but irreversible drying and the other a reaction between the asbestos and the phosphate ions of the binder.

While the resultant products are useful for various electrical applications, they are particularly suited for use as insulation in dry-type transformers. Without further treatment, the dried laminated materials can be employed in sealed dry-type transformers either as cylinders on which the coils are wrapped or as flat plates, spacers, end rings and various forms of voltage barriers. When employed in the non-sealed dry-type of transformer, the aluminum phosphate bonded product should preferably be given a further treatment with any suitable electrically insulating varnish for the purpose of increasing the water resistance.

A particularly useful varnish treatment comprises the use of an organo polysiloxane resin such as a methyl polysiloxane resin. The polysiloxane resins have the special advantage in that they can be applied to the air dried laminated product prior to the final bake and the final drying bake at 200–250° C. can then be employed both for the purpose of removing the residual water from the laminated product and for curing the polysiloxane resin. For example, cylinders made by the usual wrapping process have been allowed to air dry on a mandrel over night, stripped from the mandrel, ground smooth with a sanding belt, and sawed to final length. In this unbaked state, the cylinders are in their strongest condition physically due probably to the relatively large water content of the aluminum phosphate binder and impregnant at this point. The transformer coils are wound upon the air dried cylinders while they are still in the unbaked and strongest condition and the entire assembly is then given a varnish treatment employing a polysiloxane varnish. A subsequent high temperature bake as, for example, at 250° C. for the purpose of curing the polysiloxane resin, is also sufficient to properly dry the aluminum phosphate-asbestos cylinders and does this without detriment to the polysiloxane resin.

When a low temperature baking varnish such as a phenolic varnish is employed for the impregnation, the cylinders preferably receive a high temperature bake at 200° C. or thereabouts prior to the assembly of the coils and the assembly is thereafter subjected to the varnish treatment. In this modification of the process, it has been found that best results are obtained if, prior to the varnish treatment, the laminated material is treated with a dilute solution of ammonium hydroxide in order to neutralize any residual acids present in the laminated product. The residual ammonia is then evaporated from the treated product so that no alkaline or acid electrolytes are present in a free state in or on the laminated material at the time of the varnish impregnation. The ammonium hydroxide treatment may suitably comprise a dipping of the laminated material in a dilute solution of ammonium hydroxide for a time merely sufficient to obtain a complete wetting of the surface of the laminated product by the ammonium hydroxide solution.

As has been previously indicated, products of the present invention are machineable. They can be sawed, sanded and drilled, as desired. As the raw materials employed in their manufacture are relatively cheap, the products are relatively inexpensive.

What I claim as new and desire to secure by Letters Patent of the United States is:

1. A laminated asbestos product consisting essentially of a plurality of asbestos sheets individually impregnated with mono-aluminum phosphate and bonded together into a hard dense structure by an aluminum phosphate of the formula $Al_x(H_{3-x}PO_4)_3$ where $x$ has a value of from about 1.3 to 1.7, the final dry product containing by weight from 20% to 30% aluminum phosphate.

2. The product of claim 1 coated and impregnated with an insulating resin varnish.

3. The product of claim 2 in which the varnish is a polysiloxane.

4. The method of making a hard dense electrically insulating laminated asbestos product which comprises impregnating asbestos paper with an aqueous solution of mono-aluminum phosphate, drying the impregnated sheet to a tack-free state, coating the impregnated sheet with solution of an aluminum phosphate of the formula $Al_x(H_{3-x}PO_4)_3$ wherein $x$ has a value of from 1.3 to 1.7 until the total aluminum phosphate proportion is 20% to 30% by weight on a dry basis, and forming a laminated product from said coated sheet.

5. The process of claim 4 in which the laminated product is heated to an elevated temperature of about 200° C. to remove the water therefrom.

6. The process of making a laminated asbestos insulating material which comprises impregnating asbestos sheet material with a solution of mono-aluminum phosphate, drying the impregnated sheet to a tack-free state, coating the impregnated sheet with a solution of aluminum phosphate of the formula $Al_x(H_{3-x}PO_4)_3$ wherein $x$ has a value of from 1.3 to 1.7, until the total aluminum phosphate proportion is 20% to 30% by weight on a dry basis, forming a laminated product from the coated sheet, air-drying the laminated product, coating and impregnating the air-dried product with an organo-polysiloxane resin and heating the resultant product to an elevated temperature sufficient to cure the polysiloxane resin.

7. The process of making a laminated asbestos insulating material which comprises impregnating asbestos sheet material with a solution of mono-aluminum phosphate, drying the impregnated sheet to a tack-free state, coating the impregnated sheet with a solution of aluminum phosphate of the formula $Al_x(H_{3-x}PO_4)_3$ wherein $x$ has a value of from 1.3 to 1.7, until the total aluminum phosphate proportion is 20% to 30% by weight on a dry basis, forming a laminated product from the coated sheet, wetting the laminated product with a dilute ammonium hydroxide solution to neutralize residual acid in the product, evaporating off any residual ammonia, and finally impregnating the product with an organic resin varnish.

References Cited in the file of this patent

UNITED STATES PATENTS

| | | |
|---|---|---|
| 2,054,356 | Boughton et al. | Sept. 15, 1936 |
| 2,405,884 | Greger | Aug. 13, 1946 |
| 2,439,667 | Mathes | Apr. 13, 1948 |
| 2,444,347 | Greger et al. | June 29, 1948 |
| 2,454,218 | Schulman | Nov. 16, 1948 |
| 2,460,344 | Greger | Feb. 1, 1949 |
| 2,567,559 | Greider et al. | Sept. 11, 1951 |

UNITED STATES PATENT OFFICE

CERTIFICATE OF CORRECTION

Patent No. 2,702,068 February 15, 1955

Laurence W. Spooner

It is hereby certified that error appears in the printed specification of the above numbered patent requiring correction and that the said Letters Patent should read as corrected below.

Column 4, line 24, after "polysiloxane" and before the period, insert --resin--.

Signed and sealed this 19th day of April, 1955.

(SEAL)

Attest:
E. J. MURRY
Attesting Officer

ROBERT C. WATSON
Commissioner of Patents